April 12, 1927.
E. L. MACABEE ET AL
1,624,142
BRAKE GAUGE
Filed Nov. 19, 1925
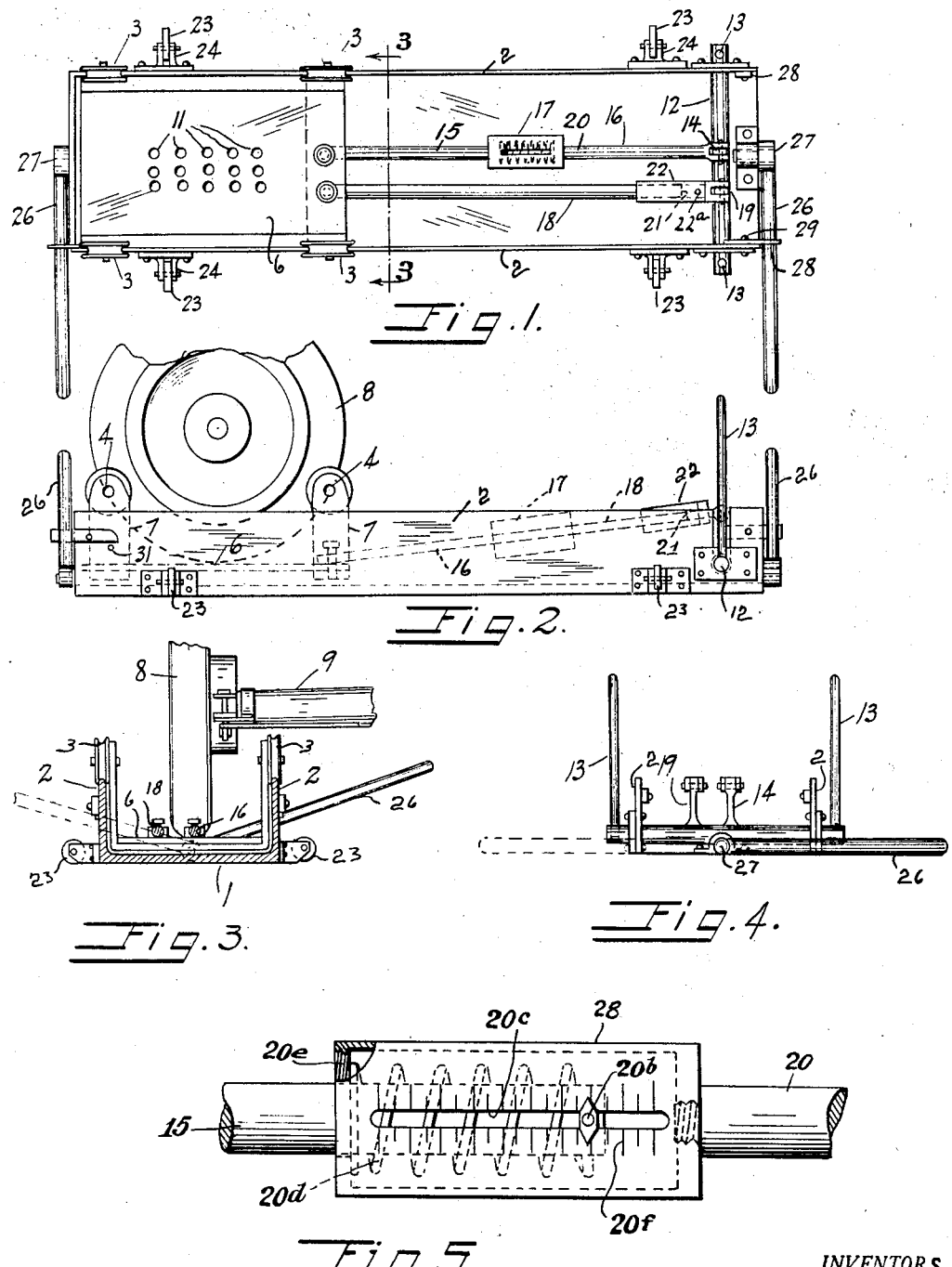
INVENTORS.
E. L. MACABEE.
F. E. MACABEE.
BY
ATTORNEYS.

Patented Apr. 12, 1927.

1,624,142

UNITED STATES PATENT OFFICE.

EDWARD L. MACABEE AND FABIAN E. MACABEE, OF HAYWARD, CALIFORNIA.

BRAKE GAUGE.

Application filed November 19, 1925. Serial No. 69,992.

The present invention relates to improvements in gauges for vehicle brakes. It often happens that the two or four brakes of a motor vehicle are not adjusted exactly alike, which causes one to be operative ahead of the other and lessens the efficiency of the entire brake mechanism.

It is proposed in the present invention to provide means whereby the brake power of each individual brake may be easily tested and gauged so as to allow the operator to adjust the individual brakes to work at the same time and to exert the same pressure.

It is proposed particularly to utilize for this purpose a movable platform on which one of the vehicle wheels may rest, to provide means for exerting pull on the said platform tending to revolve the wheel against the action of a brake applied thereto and to introduce a gauge in the pulling means whereby the power necessary to revolve the wheel against the resistance of the brake may be established. By comparing results, the brakes of a vehicle may be adjusted so that all respond to the same pull.

The preferred form of our invention is illustrated in the accompanying drawing in which:

Figure 1 shows a top plan view of our device,

Figure 2 a side elevation of the same.

Figure 3 a transverse section taken along line 3—3 of Figure 1,

Figure 4 an end view of our device, and

Figure 5 an enlarged detail view of a gauge.

While we have shown only the preferred form of the invention it should be understood that various changes or modifications may be made within the scope of the claims hereto attached without departing from the spirit of the invention.

In its preferred form our device comprises a trough 1 made preferably of sheet metal and presenting two sides 2 which may serve as rails for the wheels 3 which latter support from axles 4 a platform 6 which is suspended from the axles by means of suitable brackets 7. The platform is of such size that the wheel 8 of a motor vehicle 9 may be conveniently accommodated thereon. The platform is preferably made to simulate as near as possible road conditions, and to offer about the same frictional resistance to a turning of the wheel as the ordinary road surface would. To accomplish this object we preferably provide the platform with perforations 11 which tend to increase the frictional resistance of the platform.

At a distance from the platform there is supported in the sides 2 of the trough 1 a transverse shaft 12 provided with handles 13 by means of which the same may be revolved. The shaft 12 has an arm 14 extending therefrom which latter is connected with the platform through a rod 16 which has a gauge 17 embodied therein, the gauge indicating in pounds the pressure necessary to move the platform. The gauge may be of any suitable form, and is shown in detail in Figure 5 from which it appears that the shaft 16 is cut into two sections 15 and 20, a cylinder 28 being fixed to the latter section and slidably receiving the former section. A pin 20$^b$ extends diametrically through the section 15 so as to ride in slots 20$^c$ of the cylinder and a spring 20$^d$ is interposed between the shaft and the cylinder and bears at one end on the pin 20$^b$ and at the other end on a flange 20$^e$ at the remote end of the cylinder so that the spring opposes separation of the two shaft sections. A graduated scale 20$^f$ on the cylinder, along which the pin 20$^b$ rides, indicates the force necessary to move the platform. A second rod 18 connects a second arm 19 with the platform, the latter rod being divided transversely as at 21, while a sleeve 22, fixed to one of the sections by means of a pin 22$^a$ passes thru registering openings in the two parts, is slidably telescoped over the adjacent end of the other section. Thus, when a pull is exerted on either section, the rod will elongate, but, under a thrust, the ends of the sections will abut, so that the rod may be used for returning the platform after the same has been advanced, the rod 16 not being adapted to be used for this purpose due to the fact that the gauge is incorporated therein.

To allow the device to be moved sideway, we provide the wheels 23, two on each side, which wheels are supported in brackets 24, preferably in such a manner as to just clear the floor when the device is in its normal position. Handles 26 are pivoted to the trough at the ends thereof as shown at 27 and these handles are engageable with latches 28 pivoted to the sides as shown at 29. All latches are normally suspended from their respective pivots and clear the end edge of the trough so as to allow the handles 26 to be freely swung from one side to the other. To use the handles for moving the trough 1 the latches on the same side of the trough are swung outwardly, a stop 31 limiting this motion of each to a horizontal position, and the handles 26 are then raised to engage with the latches whereupon a further raising of the handles will place the entire weight of the trough on the two wheels 23 of the opposite side.

The device operates as follows: After the brake has been set the device is moved under one wheel so that the latter rests on the platform. The operator then presses on one or both of the handles 13 and ascertains from the gauge 17 the pressure necessary to pull the platform and to revolve the wheel against the resistance of the brake. If he finds that the platform yields too readily the brake applied to that particular wheel is tightened and a second attempt is made until the pressure required is correct for the particular brake to be tested. If the first test is unsatisfactory the platform is forced back into its original position by the aid of the rod 18.

A similar test is now made with the second wheel and the brake of the latter made to respond to substantially the same pressure as the first brake. To move the entire device either to the right or to the left the handles 26 are engaged with the proper latches and the entire device is tilted to rest on two wheels whereupon it may be easily pushed sidewise.

We claim:

1. A brake gauge of the character described, comprising a member having two parallel rails, wheels riding on the rails having a platform suspended therefrom adapted to have a vehicle wheel rest thereon, means for exerting pull on the platform and a gauge associated with the latter means allowing the force necessary to revolve the wheel against a brake applied thereto to be determined.

2. A brake gauge of the character described, comprising a member having two parallel rails, wheels riding on the rails having a platform suspended therefrom adapted to have a vehicle wheel rest thereon, a shaft supported in the rails transversely thereof and at a distance from the platform, a handle on the shaft for turning the same, an arm extending from the shaft and a rod connecting the said arm with the platform for exerting pull on the latter, and comprising relatively movable sections and a gauge between the sections for measuring the pull exerted thru the rod to move the platform.

3. A brake gauge as defined in claim 2, in combination with means for returning the platform thereof after it has been pulled forward as described, said means comprising a rod transversely divided into sections, which, while adapted within limits to be drawn apart, are brought into abutting relation under thrust, said rod being connected at one end to the platform and means operated by the shaft for exerting pressure upon the other end to thereby return the platform.

4. A brake gauge of the character described comprising a movable platform allowing a vehicle wheel to be placed thereon, a shaft supported transversely to the direction of travel of and at a distance from the platform, means for turning the shaft, an arm extending from the shaft and a rod connecting the said arm with the platform for exerting pull on the latter, said rod comprising two relatively movable sections with a force-measuring gauge connecting the sections and allowing the pressure necessary to move the platform to be measured.

5. A brake gauge of the character described, comprising movable means for frictionally engaging the periphery of a wheel, a shaft supported transversely to the direction of travel of and at a distance from said means, a handle on the shaft for turning the same, an arm extending from the shaft and a rod connecting the said arm with the said means for exerting pull on the latter, said rod comprising two relatively movable sections with a force-measuring gauge connecting the sections and allowing the pull necessary to move the said means to be measured.

6. A brake gauge as defined in claim 5 in which independent means are associated with the shaft and the platform for returning the latter when the turning movement of the shaft is reversed.

In testimony whereof we affix our signatures.

EDWARD L. MACABEE.
FABIAN E. MACABEE.